US011537762B2

(12) United States Patent
Barzic et al.

(10) Patent No.: US 11,537,762 B2
(45) Date of Patent: Dec. 27, 2022

(54) SECURE PERIPHERAL INTERCONNECT

(71) Applicant: Nordic Semiconductor ASA, Trondheim (NO)

(72) Inventors: Ronan Barzic, Trondheim (NO); Anders Nore, Trondheim (NO); Vegard Endresen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/255,872

(22) PCT Filed: Jun. 26, 2019

(86) PCT No.: PCT/EP2019/066999
§ 371 (c)(1),
(2) Date: Dec. 23, 2020

(87) PCT Pub. No.: WO2020/002427
PCT Pub. Date: Jan. 2, 2020

(65) Prior Publication Data
US 2021/0264065 A1    Aug. 26, 2021

(30) Foreign Application Priority Data

Jun. 28, 2018    (GB) ...................................... 1810653

(51) Int. Cl.
*G06F 21/85*    (2013.01)
*G06F 21/70*    (2013.01)
(52) U.S. Cl.
CPC .............. *G06F 21/85* (2013.01); *G06F 21/70* (2013.01)
(58) Field of Classification Search
CPC ........... G06F 21/85; G06F 21/78; G06F 21/70
(Continued)

(56) References Cited

U.S. PATENT DOCUMENTS 5,579,531 A    11/1996 Sugita
7,650,645 B1    1/2010 Langendorf et al.
(Continued)

FOREIGN PATENT DOCUMENTS

CN    105631364 A  *  6/2016
CN    105825128 A  *  8/2016    ........... G06F 21/554
(Continued)

OTHER PUBLICATIONS

Murray et al., "Microcomputer Peripherals", IEEE, doi: 10.1109/TIECI.1978.351539, pp. 303-322, Nov. 1978. (Year: 1978).*
(Continued)

*Primary Examiner* — Peter C Shaw
(74) *Attorney, Agent, or Firm* — Klarquist Sparkman, LLP

(57) ABSTRACT

An integrated-circuit device comprises a bus system connected to a processor, a plurality of peripherals, each connected to the bus system, hardware filter logic; and a peripheral interconnect system, separate from the bus system and connected to the peripherals. For each peripheral, the hardware filter logic stores a respective value determining whether the peripheral is in a secure state. The peripheral interconnect system provides a set of one or more channels for signalling events between peripherals. At least one channel is a secure channel or is configurable to be a secure channel. The peripheral interconnect system is configured to allow an event signal from a peripheral in the secure state to be sent over a secure channel and to prevent an event signal from a peripheral that is not in the secure state from being sent over the secure channel.

10 Claims, 5 Drawing Sheets

(58) Field of Classification Search
USPC .......................................................... 726/34
See application file for complete search history.

(56) References Cited

U.S. PATENT DOCUMENTS

| | | | |
|---|---|---|---|
| 8,719,925 B1* | 5/2014 | Berg | G06F 21/554 |
| | | | 726/22 |
| 10,140,227 B1 | 11/2018 | Machulsky et al. | |
| 2003/0200451 A1 | 10/2003 | Evans et al. | |
| 2003/0226029 A1 | 12/2003 | Porter et al. | |
| 2004/0143714 A1 | 7/2004 | Watt | |
| 2004/0221173 A1 | 11/2004 | Moyer et al. | |
| 2004/0250063 A1 | 12/2004 | Gulick et al. | |
| 2005/0033969 A1 | 2/2005 | Kiiveri et al. | |
| 2005/0114616 A1 | 5/2005 | Tune et al. | |
| 2006/0090084 A1 | 4/2006 | Buer | |
| 2008/0052534 A1 | 2/2008 | Harada et al. | |
| 2009/0292901 A1 | 11/2009 | Henry et al. | |
| 2010/0186080 A1 | 7/2010 | Thanner et al. | |
| 2011/0225651 A1 | 9/2011 | Villasenor et al. | |
| 2012/0036347 A1 | 2/2012 | Swanson et al. | |
| 2012/0047576 A1 | 2/2012 | Do et al. | |
| 2012/0110659 A1 | 5/2012 | Brokish et al. | |
| 2013/0031290 A1 | 1/2013 | Schwartz et al. | |
| 2013/0031374 A1 | 1/2013 | Thom et al. | |
| 2013/0047250 A1 | 2/2013 | Kothari | |
| 2014/0188732 A1 | 7/2014 | Kobres | |
| 2014/0282819 A1 | 9/2014 | Sastry et al. | |
| 2014/0304439 A1 | 10/2014 | Elahi et al. | |
| 2014/0366131 A1 | 12/2014 | Lai | |
| 2015/0378944 A1 | 12/2015 | Robertson et al. | |
| 2016/0004647 A1 | 1/2016 | Eppensteiner et al. | |
| 2016/0004656 A1 | 1/2016 | Arbel et al. | |
| 2016/0267038 A1* | 9/2016 | Elahi | G06F 13/404 |
| 2016/0321472 A1 | 11/2016 | Pedersen | |
| 2016/0357991 A1 | 12/2016 | Hershman et al. | |
| 2017/0060637 A1 | 3/2017 | Persson et al. | |
| 2017/0139851 A1 | 5/2017 | Pean et al. | |
| 2018/0060077 A1 | 3/2018 | Abdulhamid et al. | |
| 2018/0136967 A1 | 5/2018 | Asbe et al. | |
| 2018/0144145 A1 | 5/2018 | Pearson | |
| 2018/0239727 A1 | 8/2018 | Hershman et al. | |

FOREIGN PATENT DOCUMENTS

| | | | | |
|---|---|---|---|---|
| CN | 105683981 B * | 10/2018 | ............ | G06F 12/14 |
| DE | 102013101508 A1 * | 8/2013 | ............ | G06F 21/85 |
| EP | 2 725 517 A1 | 4/2014 | | |
| GB | 2 396 713 A | 6/2004 | | |
| GB | 2 396 930 A | 7/2004 | | |
| GB | 2497528 A * | 6/2013 | ............ | G06F 13/12 |
| GB | 2 501 470 A | 10/2013 | | |
| GB | 2 531 844 A | 5/2016 | | |
| GB | 2531844 A * | 5/2016 | ............ | G06F 21/53 |
| GB | 2539455 A * | 12/2016 | ............ | G06F 12/14 |
| WO | WO 2013/088121 A1 | 6/2013 | | |
| WO | WO-2013088121 A1 * | 6/2013 | ............ | G06F 13/12 |
| WO | WO-2016203193 A1 * | 12/2016 | ........... | G06F 13/102 |

OTHER PUBLICATIONS

Merkin et al., "Method to Bound Peripheral Component Interconnect System Configurations," TDB, v37 n10 10-94, Oct. 1, 1994, p. 455-456. (Year: 1994).*
Abdelnour et al., "Peripheral Component Interconnect-Lite Bus Interface Design," TDB, v40 n7 07-97, Jul. 1, 1997, p. 55-56. (Year: 1997).*
IP.com, "Method and System for Passing Messages in a PCIe Environment," IPCOM000237920D, Jul. 21, 2014, pp. 1-6. (Year: 2014).*
P. Pannuto et al., "MBus: A System Integration Bus for the Modular Microscale Computing Class," in IEEE Micro, vol. 36, No. 3, pp. 60-70, May-Jun. 2016, doi: 10.1109/MM.2016.41. (Year: 2016).*
U.S. Appl. No. 17/048,937, filed Oct. 19, 2020, Talvitie et al.
U.S. Appl. No. 17/255,876, filed Dec. 23, 2020, Barzic et al.
U.S. Appl. No. 17/255,921, filed Dec. 23, 2020, Dekens.
ARM1176JZ-S, Revision: r0p7, Technical Reference Manual, Table of Contents, List of Tables, List of Figures, Preface, Figure 2-2, Nov. 27, 2009, 24 pages.
ARM AMBA Arbiter Data Sheet, Chapter 1, Copyright © 1995-1997 ARM Limited, 10 pages.
ARM AMBA 5 AHB Protocol Specification AHB5, AHB-Lite, Copyright © 2001, 2006, 2010, 2015 ARM Limited or its affiliates, 86 pages.
ARM AMBA 3 AHB-Lite Protocol v1.0 Specification, Copyright © 2001, 2006 ARM Limited, 72 pages.
ARM CoreLink SIE-2000 System IP for Embedded, Revision: R2p0, Technical Reference Manual, Copyright © 2016 ARM Limited or its affiliates, 155 pages.
Arm® CoreLink™ SSE-200 Subsystem for Embedded, Revision: r1p0, Technical Reference Manual, Copyright © 2016, 2017 Arm Limited (or its affiliates), 178 pages.
ARM Cortex-M33 Processor Technical Reference Manual, B3.1 About Security Attribution and Memory Protection, http://infocenter.arm.com/help/topic/com.arm.doc.100230_0002_00_en/jfa1433859029571.html, downloaded Jun. 14, 2018, 2 pages.
ARM Security Technology, 2009, Building a Secure System using TrustZone (RTM) technology, arm.com, [online], available from: http://infocenter.arm.com/help/topic/com.arm.doc.prd29-genc-009492c/PRD29-GENC-009492C_trustzone_security_whitepaper.pdf, [Accessed Oct. 16, 2018].
ARM—TrustZone technology for the ARMv8-M architecture, Copyright © 2017 ARM Limited or its affiliates, 28 pages.
Cyclone v Hard Processor System Technical Reference Manual, Altera, Cover Page, Table of Contents, Chapter 7, pp. 16, 36-60 and Chapter 11, p. 23, Oct. 28, 2016.
International Search Report and Written Opinion for PCT/EP2019/060004, dated Jul. 17, 2019, 12 pages.
IPO Search Report under Section 17(5) for GB1806465.9, dated Oct. 18, 2018, 6 pages.
New AMBA Specification Extends Security to Embedded Design: AMBA 5 AHB5, https://community.arm.com/processors/b/blog/posts/new-amba-specification-extends- . . . , downloaded Apr. 25, 2018, 6 pages.
Payne, "How to Implement a Secure IoT system on ARMv8-M," Published on Apr. 14, 2017, 3 pages.
TrustZone—Arm Developer, arm TrustZone, Introducing Arm TrustZone, https://developer.arm.com/technologies/trustzone, downloaded Apr. 25, 2018, 11 pages.
Yee, Carnegie Mellon University, 1994, "Using Secure Coprocessors", Bennet Yee, citeseerx.ist.psu.edu. [online]. Available from: http://citeseerx.ist.pdu.edu/viewdoc/download?doi=10.1.1.28.4872&rep=rep1&type=pdf, [Accessed Oct. 16, 2018].

* cited by examiner

SECURE PERIPHERAL INTERCONNECT

CROSS REFERENCE TO RELATED APPLICATIONS

This is the U.S. National Stage of International Application No. PCT/EP2019/066999, filed Jun. 26, 2019, which was published in English under PCT Article 21(2), which in turn claims the benefit of Great Britain Application No. 1810653.4, filed Jun. 28, 2018.

BACKGROUND OF THE INVENTION

This invention relates to integrated-circuit devices having peripheral interconnects, and methods of operating the same.

Integrated-circuit devices, such as radio-on-chip devices, typically comprise one or more processors and a number of peripherals, which are connected to the processor by a bus, such as an Arm™ AMBA (Advanced Microcontroller Bus Architecture) bus system. Examples of peripherals include a timer, a cryptographic co-processor, a serial interface (e.g., SPI or UART), and an embedded radio transceiver.

In a simple architecture, the processor communicates directly with each peripheral over the bus. Peripherals communicate only with the processor, and not directly with each other. This is inefficient.

The applicant has previously described a peripheral-to-peripheral communication system in WO 2013/088121. This provides a programmable peripheral interconnect (PPI) that can be configured by the processor so that a first peripheral can signal an event to a second peripheral, so as to cause the second peripheral to perform a task in response to the event of the first peripheral. A channel in the PPI can be configured to connect the event output of the first peripheral to the task input of the second peripheral by writing address values associated with the event output and with the task input as an entry in a mapping table.

For example, such a PPI could be programmed to create a channel between an event output of a serial-interface peripheral and a task input of a crypto-processor. The event signal could be used to signal when the peripheral finishes receiving data over the serial interface and writing the data to a predetermined memory address. The task signal could cause the crypto-processor to read the data from the predetermined memory address and input the data to a cipher operation. The PPI channel connects the event to the task so that cipher operation is initiated in response to the serial-interface peripheral signalling that it has finished writing the data to the memory. This signalling can occur without the processor having to be awake when the signalling takes place, thereby resulting in power savings and potentially also in faster and more accurate device timings.

Another example of a peripheral interconnect system is provided in U.S. Pat. No. 5,579,531A (Mitsubishi). It discloses a set of signals lines, or event buses, to which peripherals can be connected, using multiplexers, so that signals can be transmitted between the peripherals.

However, the applicant has recognised that peripheral interconnect systems can present a security risk in some contexts.

The memory of integrated-circuit devices may contain sensitive information, such as data or software code, to which access should be restricted. Similarly, some peripherals, such as cryptographic accelerators, may handle sensitive data, or provide other sensitive functions. It can therefore be desirable to limit access to certain memory regions and/or to certain peripherals only to "trusted" software code, such as code developed by the device manufacturer, and to block access by other code, such as application code developed by a third party.

Arm™ TrustZone provides compatible Arm™ microcontrollers (e.g., a Cortex™-M33) with two operating states: "Secure" and "Non-Secure".

The product designer can designate certain regions of memory and/or certain peripherals (e.g., a cryptoprocessor), as being "secure-world" resources, while other regions of memory and peripherals are not so designated. The device memory map (which covers all of the system memory and all the memory-mapped peripheral registers) can be divided into secure and non-secure address ranges. A peripheral may be permanently "secure" or "non-secure", or its status can be configured by software through a Peripheral Protection Control (PPC) register. Hardware logic in the bus fabric ensures that no "secure-world" resources can be accessed directly by "non-secure-world" software, thereby providing a security perimeter around sensitive resources. Bus infrastructure components can support partitioning of memory spaces in memory components, to block non-secure accesses to secure memories.

Secure transactions can only be generated by secure software or, in cases of testing, an authorised debugger. Non-secure (non-trusted) software applications cannot access secure (trusted) resources directly, but must request access through APIs (application programming interfaces) provided by secure software. These APIs can implement authentication checks to decide whether to permit access to a secure service. This approach makes it harder for attackers, who may have compromised part of the non-secure software code, to access sensitive information stored on such a device, or for software bugs to inadvertently gain access to secure resources.

However, the applicant has recognised that it could be possible for an attacker to use a peripheral interconnect system to compromise the security of such a device, or other secure devices.

The present invention seeks to provide a more secure approach to peripheral-to-peripheral communication.

SUMMARY OF THE INVENTION

From a first aspect, the invention provides an integrated-circuit device comprising:
  a bus system;
  a processor, connected to the bus system;
  a plurality of peripherals, each connected to the bus system;
  hardware filter logic; and
  a peripheral interconnect system, separate from the bus system and connected to the plurality of peripherals,
wherein:
  for each of the plurality of peripherals, the hardware filter logic stores a respective value determining whether the peripheral is in a secure state;
  the peripheral interconnect system provides a set of one or more channels for signalling events between peripherals of the plurality of peripherals;
  at least one channel of the set of channels is a secure channel or is configurable to be a secure channel;
  the peripheral interconnect system is configured to allow an event signal from a peripheral that is in the secure state to be sent over a secure channel of the set of channels; and the peripheral interconnect system is configured to prevent an event signal from a peripheral that is not in the secure state from being sent over the secure channel.

From a second aspect, the invention provides a method of operating an integrated-circuit device, wherein the integrated-circuit device comprises:
- a bus system;
- a processor, connected to the bus system;
- a plurality of peripherals, each connected to the bus system;
- hardware filter logic; and
- a peripheral interconnect system, separate from the bus system and connected to the plurality of peripherals, providing a set of one or more channels for signalling events between peripherals of the plurality of peripherals, wherein:
- for each of the plurality of peripherals, the hardware filter logic stores a respective value determining whether the peripheral is in a secure state; and
- a channel of the set of channels is a secure channel or is configurable to be a secure channel, the method comprising:
- the peripheral interconnect system allowing an event signal from a peripheral that is in the secure state to be sent over the secure channel; and
- the peripheral interconnect system preventing an event signal from a peripheral that is not in the secure state from being sent over the secure channel.

Thus it will be seen that, in accordance with the invention, an integrated-circuit device has a peripheral interconnect system that provides one or more secure channels over which only secure peripherals can signal events. In this way, a secure peripheral can safely be subscribed to a secure channel, in order to receive an event signal over the secure channel, and perform a task in response to the event signal, without any concern that the event signal could be have been sent by a non-secure peripheral.

This prevents the peripheral interconnect system being used to trigger a task on a secure peripheral from a non-secure peripheral (i.e., a peripheral that is not in the secure state). Without such protection, prior-art systems could potentially permit malicious non-secure code to use the PPI to trigger a secure peripheral to perform a task that would not otherwise be accessible to the non-secure code (e.g., writing harmful data to a secure region of memory).

The peripheral interconnect system may further be configured to allow a peripheral that is in the secure state to receive an event signal over the secure channel, but prevent a peripheral that is not in the secure state from receiving an event signal over the secure channel. This can provide still further security by preventing non-secure peripherals from being able to subscribe to a secure channel, which might otherwise allow a leaking of information from the "secure world" to the "non-secure world", through the detection of event signals from secure peripherals by non-secure peripherals.

The bus system may be configured to carry bus transactions and to carry security-state signals for distinguishing between secure bus transactions and non-secure bus transactions. The hardware filter logic may be connected to the bus system. The hardware filter logic may be configured to allow or block bus transactions on the bus system, in dependence on at least i) the security state of each bus transaction, and ii) whether the bus transaction addresses a peripheral that is in a secure state.

The set of channels may comprise a plurality of channels—e.g., two, five, ten or more channels. The peripheral interconnect system may be configured to prevent event signals from peripherals that are not in the secure state from being sent over any of the secure channels. Each peripheral may comprise one or more event outputs and/or one or more task inputs. Each event output may be connectable to any of the one or more channels. Each task input may be connectable to any of the channels. Each peripheral having an event output may comprise a multiplexer for connecting the event output to a selectable one of the channels. In this way, event signals from the event output can be published on the selected channel. The selection of the channel may be controlled through a register interface of the peripheral. Each peripheral having a task input may comprise a demultiplexer for connecting a selectable one of the channels to the task input. In this way, the task input of the peripheral can be subscribed to receive event signals from the selected channel. Again, the selection of the channel may be controlled through a register interface of the peripheral. In some embodiments, a channel may receive events from one or more peripherals, and a channel may output events to one or more peripherals—i.e., in some embodiments, multiple peripherals may be subscribed to the same channel.

The peripheral interconnect system, or the hardware filter logic, may provide a register interface for configuring channels of the set of channels as secure channels. Channels that are not configured as secure channels may be non-secure channels. If the security state of each channel is set at the hardware filter logic, the device may comprise a communication path (e.g., a set of lines) for communicating security-state values from the hardware filter logic to the peripheral interconnect system. The peripheral interconnect system may be configured to allow event signals from secure and non-secure peripherals to be sent over a non-secure channel. It may be configured to allow peripherals that are in the secure state, and peripherals that are in the non-secure state, to receive event signals over the non-secure channel.

The peripheral interconnect system may comprise an interconnect controller peripheral, accessible over the bus system. The interconnect controller may provide a register interface for controlling the peripheral interconnect system. It may provide an interface for enabling and disabling each channel, preferably individually. The interconnect controller peripheral may be in, or may support, a non-secure state, such that at least a first part of its register interface is accessible to non-secure bus requests. However, it may additionally be a split-security peripheral, meaning that a second part of the register interface is not writable by non-secure bus requests and/or is not readable by non-secure bus requests.

In particular, the register interface may comprise a first hardware register and a second hardware register. The interconnect controller peripheral may comprise an input for receiving security-state signals from the bus system.

The interconnect controller peripheral may support a split-security state in which the interconnect controller peripheral is configured to:
- prevent a non-secure bus transaction from accessing the first hardware register;
- allow a secure bus transaction to access the first hardware register; and
- allow a non-secure bus transaction to access the second hardware register.

It may also be configured to allow secure bus transactions to access the second hardware register.

This split-security state differs from a standard non-secure peripheral state, in which non-secure bus requests are granted full access to all of a peripheral's register interface. Instead, the split-security state allows the interconnect controller peripheral to apply security protection within the controller itself, in respective of an individual register or set of registers.

In particular, the interconnect controller peripheral preferably prevents non-secure bus transactions from accessing one or more registers (which may be bit-field positions) that relate to the configuration of one or all of the secure channels. The first hardware register may determine whether a secure channel, or secure group of channels, is enabled or disabled. Thus the interconnect controller peripheral may be configured to prevent a non-secure bus request from disabling a secure channel. In this way, non-secure software cannot accidentally or maliciously disable a secure channel, which might otherwise interfere with the proper functioning of the device. The second hardware register may relate to one or more of the non-secure channels; it determine whether a non-secure channel, or non-secure group of channels, is enabled or disabled.

If a non-secure bus transaction attempts to read the first hardware register, the interconnect controller peripheral may return zero, regardless of the data content. If a non-secure bus transaction attempts to write to the first hardware register, the interconnect controller peripheral may ignore the write request.

The interconnect controller peripheral may provide an interface for grouping two or more channels into a group. It may provide an interface for enabling and/or disabling a group of channels with a single data write (e.g., depending on the value of a single bit in a bit-field). The peripheral interconnect system may be configured to prevent an event signal from a peripheral that is not in the secure state from being sent over any channel of a group when at least one channel in the group is a secure channel. Similarly, it may prevent a peripheral that is not in the secure state from receiving an event signal over any of the channels of a group in which at least one channel in the group is a secure channel. The peripheral interconnect system may be configured so that, only when all the channels in a group are non-secure, can a non-secure peripheral send or receive an event signal over any channel in the group.

The processor may be switchable between a secure state and a non-secure state. The processor may determine its own security state—e.g., through software instructions executing on the processor. It may be configured to initiate secure bus transactions when in the secure state, and to initiate non-secure bus transactions when in the non-secure state. The device may comprise one or more further processors or other bus masters which may initiate secure and/or non-secure bus transactions.

The hardware filter logic may comprise a communication path (e.g., a set of lines) for communicating the security state of each peripheral to the peripheral interconnect system. The peripheral interconnect system may comprise hardware channel-blocking logic for preventing non-secure peripherals sending event signals over a secure channel and/or for preventing non-secure peripherals from receiving event signals from a secure channel. The hardware channel-blocking logic may be configured to use the security state of a peripheral to determine whether to allow an event signal to be sent over a secure channel by the peripheral and/or received from a secure channel by the peripheral. It may prevent event signals that are determined not to be allowed. When preventing access to a channel, the peripheral interconnect system may simply block the event signal (e.g., at a connection point with the secure channel), or it may block the event signal and additionally signal an error state to the device—e.g., by generating an interrupt to the processor.

The security state of a peripheral, as represented by the value stored in the hardware filter logic, may be fixed (i.e., hardwired) or may be configurable (e.g., stored in a volatile or non-volatile register). The value may be a single bit (i.e. secure or not secure), or more complex data. The hardware filter logic may provide a register interface (e.g., through a system protection unit) for controlling whether one or more of the peripherals is in a secure state (and optionally for setting the security state of other components, including one or more memory regions). Software executing on the processor (e.g., bootloader code) may set the security state of any peripherals, of the plurality peripherals, whose security state is configurable—e.g., by writing to a register of such a system protection unit. Once the security state of a peripheral is set, the hardware filter logic may be set to prevent further changes until the device is next reset, although this is not essential.

The hardware filter logic for the bus system may be configured to allow bus transactions on the bus system in accordance with filtering rules that determine, for each peripheral, in dependence on whether or not the peripheral is in a secure state, whether secure bus transactions initiated by the processor should be received by the peripheral, and whether non-secure bus transactions initiated by the processor should be received by the peripheral. More generally, the filtering rules may determine, for each pairing of master component (e.g., the processor and any further processors or bus-master peripherals) and slave component (e.g., peripherals and memory regions), whether secure bus transactions initiated by the master component should be received by the slave component, and whether non-secure bus transactions initiated by the master component should be received by the slave component. The filtering rules may be specified at the component level, rather than at the address level. In other words, bus transactions for every address assigned to a particular peripheral or memory region may be treated in the same way, by the hardware filter logic.

The hardware filter logic may be configured to intercept and filter bus transactions at one or more points in the bus system. It may comprise one or more filter units for intercepting bus transactions at respective interception points. The hardware filter logic may prevent non-secure bus transactions from accessing secure memory regions and/or peripherals that are in a secure state. The hardware filter logic may be configured to use i) the slave address of an intercepted bus transaction, ii) the security state of the intercepted bus transaction, and iii) the security state of a peripheral or memory region associated with the slave address, to determine whether to allow the intercepted bus transaction, in accordance with the filtering rules. It may block intercepted bus transaction that are determined not to be allowed.

The peripherals may be any peripheral components. They may comprise an interface peripheral, such as an SPI (Serial Peripheral Interface) peripheral, UART (Universal Asynchronous Receiver-Transmitter) peripheral, two-wire interface peripheral, I²C (Inter-Integrated Circuit) peripheral. They may comprise a data-conversion peripheral, such as an ADC (Analogue-to-Digital Converter) peripheral, DAC (Digital-to-Analogue Converter) peripheral, PWM (Pulse Width Modulation) peripheral, quadrature decoder peripheral, or a cryptographic co-processor. They may comprise the peripheral interconnect controller itself.

The device may comprise a memory. The memory may comprise volatile memory, such as RAM, and/or non-volatile memory, such as flash. The hardware filter logic may comprise a memory controller for controlling access to the memory. The memory may comprise one or more secure regions and one or more non-secure regions. The filtering rules, implemented by the hardware filter logic, may determine whether a bus master can access a region of memory, in dependence on the security state of the bus master and/or the security state of the memory region. The memory may store software for execution by the processor.

The peripherals may have respective memory-mapped register interfaces, accessible over the bus system. The device may implement a global memory map which assigns respective addresses to one or more memories (e.g., RAM and flash) and to respective peripherals.

The hardware filter logic may be a hardware state machine. It may comprise any number of logic gates. It preferably does not contain a general-purpose processor. It may comprise one or more input or output registers which may be addressable over the bus system, although this is not essential.

The security-state signals may be sent over a security-state signal line in the bus system. The security-state signal line may be a dedicated line that is only used to indicate a security state. The line may be a single-bit line. In some embodiments, the security-state signal line may be asserted to indicate a secure bus transaction and de-asserted to indicate a non-secure bus transaction. In other embodiments, it may be the other way around. In general, it will be appreciated that outputting a security-state signal representing a non-secure state might, in some embodiments, consist of not outputting a signal representing a secure state (i.e., remaining silent), or vice versa.

In some embodiments, the bus system is an AMBA bus system. It may comprise one or more AHB's and/or one or more APB's. The bus system may implement the AHB 3, AHB 5 or higher specification. The secure-state signal may be sent over an AHB HNONSEC signal line—e.g., by de-asserting HNONSEC to communicate the secure-state signal.

It will be appreciated that some embodiments may support more than two security states for master components and/or for slave components—e.g., having three states: a non-secure state, a secure state, and a very-secure state. The bus system may be configured to carry security-state signals that distinguish between three or more security states for each bus transaction. The peripheral interconnect system may enable channels to be in one of three or more security states, and may restrict outputting and/or receiving event signals to peripherals that have a security state that is equal to, or that is equal to or higher than, the security state of the respective channel.

The integrated-circuit device may be a system-on-chip, multiprocessor system-on-chip, radio-on-chip device, or any other form of integrated circuit.

Although the peripheral interconnect is preferably separate from bus system, this is not essential in all aspects.

Thus, from a further aspect, the invention provides an integrated-circuit device comprising:
  a bus system;
  a processor, connected to the bus system;
  a plurality of peripherals, each connected to the bus system;
  hardware filter logic; and
  a peripheral interconnect system, connected to the plurality of peripherals,
wherein:
  for each of the plurality of peripherals, the hardware filter logic stores a respective value determining whether the peripheral is in a secure state;
  the peripheral interconnect system provides a set of one or more channels for signalling events between peripherals of the plurality of peripherals;
  at least one channel of the set of channels is a secure channel or is configurable to be a secure channel;
  the peripheral interconnect system is configured to allow an event signal from a peripheral that is in the secure state to be sent over a secure channel of the set of channels; and
  the peripheral interconnect system is configured to prevent an event signal from a peripheral that is not in the secure state from being sent over the secure channel.

From another aspect, the invention provides a method of operating an integrated-circuit device, wherein the integrated-circuit device comprises:
  a bus system;
  a processor, connected to the bus system;
  a plurality of peripherals, each connected to the bus system;
  hardware filter logic; and
  a peripheral interconnect system, connected to the plurality of peripherals, providing a set of one or more channels for signalling events between peripherals of the plurality of peripherals,
wherein:
  for each of the plurality of peripherals, the hardware filter logic stores a respective value determining whether the peripheral is in a secure state; and
  a channel of the set of channels is a secure channel or is configurable to be a secure channel,
the method comprising:
  the peripheral interconnect system allowing an event signal from a peripheral that is in the secure state to be sent over the secure channel; and
  the peripheral interconnect system preventing an event signal from a peripheral that is not in the secure state from being sent over the secure channel.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
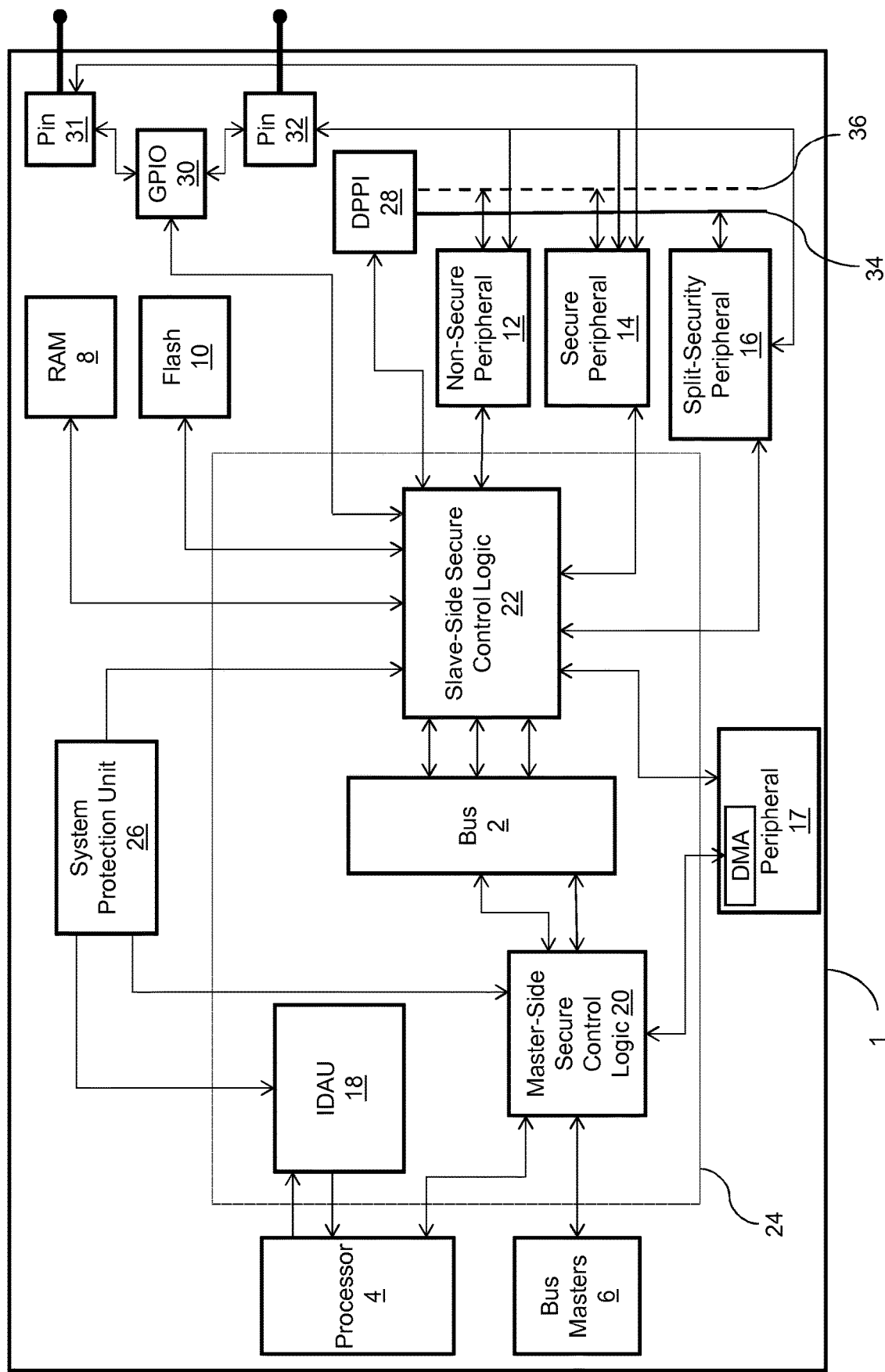
FIG. 1 is a schematic drawing of an integrated-circuit device embodying the invention.

FIG. 1 shows a system-on-chip (SoC) integrated circuit device 1 in accordance with an embodiment of the present invention.

The device 1 includes a bus interconnect system 2 connecting a processor 4 and other bus masters 6 to RAM 8, flash memory 10 and exemplary peripherals 12, 14, 16, 17. The peripherals 12, 14, 16, 17 have input and/or output registers that are addressable over the bus system 2 (i.e., memory-mapped I/O).

The bus system 2 may comprise a number of interconnected buses. In some embodiments, it is an Arm™ AMBA (advanced microcontroller bus architecture) bus system, and contains one or more Arm™ AHB's (advanced high performance buses) and one or more Arm™ APB's (advanced peripheral buses).

The master components 4, 6 are configured to issue bus requests on the bus interconnect system 2. The bus masters 6 may be other processors, peripherals with built-in DMA controllers, or any other bus masters. The bus requests can be either secure or non-secure bus requests depending on a security attribute of the master component 4, 6. The security attribute of the processor 4 is variable, depending the current state of the processor 4—it is typically under the control of software executing on the processor 4. The security attributes of other bus masters 6 may be fixed (i.e., hard-wired) or variable.

The memory 8, 10 and peripherals 12, 14, 16, 17 are configured to be responsive to certain requests depending on a respective security attribute of the memory or peripheral. The RAM 8 and flash memory 10 may be divided into regions which are assigned different respective security attributes (i.e., "secure" memory regions and "non-secure" memory regions).

The various memory regions and peripherals may be responsive to secure requests, non-secure requests, or both types of request. The security attribute of each memory region or peripheral may be fixed at the design stage or may be dynamically configurable.

Some peripherals 12 may be designated (permanently or switchably) "non-secure" peripherals and have all of their functions available to a bus master 4, 6 that is in a non-secure state. Some peripherals 14 may be designated (permanently or switchably) "secure" peripherals and have all of their functions available only to bus masters 4, 6 that are in a secure state. Still other peripherals 16 may be "split-security" peripherals, and, when designated (permanently or switchably) as "non-secure", such peripherals 16 will have some functions that are accessible to non-secure bus masters 4, 6 and other functions that are accessible only to secure bus masters 4, 6.

Some of the peripherals 17 are slave components on the bus system 2, but also contain DMA (direct memory access) controllers that allow them to act as bus masters—e.g., for reading or writing data from the RAM 8 without the involvement of the processor 4.

The device 1 further includes a general purpose input/output (GPIO) controller 30 which controls access to GPIO pins 31, 32, to which devices external to the device 1 can be connected. Each GPIO pin 31, 32 can have a security attribute assigned to it. The GPIO controller 30 has a register interface and acts as a further peripheral.

The device 1 further includes a distributed programmable peripheral interconnect (DPPI) 28. The DPPI 28 provides a matrix of interconnects, separate from the bus system 2, which connects peripherals 12, 14, 16 and allows one peripheral to signal an "event" to one or more other peripherals. Receipt of an "event" signal, over the DPPI 28, by a subscribing recipient peripheral, can trigger a task by the other peripheral.

The DPPI 28 provides a number of channels 34, 36 (two exemplary channels are shown in FIG. 1, but there may be more than two channels), which connect event outputs to task inputs. The peripherals 12-16 contain multiplexers, controllable by the processor 4 through respective register interfaces, for subscribing an event output of a peripheral to a particular channel, and for subscribing a task input of a peripheral to a particular channel.

The DPPI 28 provides a register interface for configuring the channels over the bus system 2, and is effectively a further slave peripheral.

The DPPI 28 can be used to support peripheral-to-peripheral communication while the processor 4 is in a sleep state, thereby providing substantial power savings compared with processor-mediated communication over the bus system 2.

Each channel 34, 36 can be defined as either secure 34 or non-secure 36. Only "secure" peripherals 14 can access a secure channel, to issue an event towards another peripheral, or to subscribe to the channel. If a "non-secure" peripheral 12 (which could be a split-security peripheral 16, when set to a "non-secure" state) attempts to push an event on a secure channel 34 then nothing will happen. If a non-secure peripheral 12, 16 attempts to subscribe to the secure channel 34 then it will not see any of the events on this channel.

The bus system 2 further comprises an implementation-defined attribution unit (IDAU) 18, master-side secure control logic 20, and slave-side secure control logic 22. The bus system 2, together with this secure control logic 20, 22 and attribution unit 18, are referred to herein as the security system logic 24 of the device 1.

This hardware security system logic 24 implements filtering rules that determine, for each pairing of master component 4, 6 and slave component 12, 14, 16, whether secure bus requests from the master component are receivable by the slave, and whether non-secure bus requests from the master component are receivable by the slave component. The filtering rules may also determine access permissions for the master components 4, 6 to defined regions of the RAM 8 and/or flash memory 10.

These filtering rules are typically fixed (i.e., hardwired) by design for every possible pairing of i) secure master to secure peripheral or memory region, ii) secure master to non-secure peripheral or memory region, iii) non-secure master to secure peripheral or memory region, and iv) non-secure master to non-secure peripheral or memory region. However, in some embodiments, the filtering rules may be configurable—e.g., depending at least partly on configuration data stored in the flash memory 10. The filtering rules may be relatively simple—for example, every secure bus-master can access every slave component (i.e. every peripheral and every memory region), whether the slave device is in a secure state or a non-secure state, while every non-secure bus-master can access only non-secure slave components and is blocked from accessing any secure slave component. Alternatively, the filtering rules may be more complex—for example, assigning different access rights to different bus-masters and/or different slave components, such that, e.g., a first processor can access a secure peripheral while the first processor in a secure state, whereas a second processor cannot access the same secure peripheral at all.

The device 1 further comprises a system protection unit (SPU) 26. The SPU 26 acts as a central point in the system to control access to memories, peripherals and other resources. The SPU 26 and security system logic 24 together provide the following features:

Arm™ TrustZone™ support, allowing definition of Secure, Non-Secure and Non-Secure Callable memory regions;

protects memory regions and peripherals from non-processor master devices, such as DMA controllers;

DPPI 28 access protection, preventing non-secure code from publishing or subscribing to secured DPPI channels;

GPIO pin access protection, preventing non-secure code and peripherals from reading or changing the state of a secure pin 31, 32; and external domain access protection, controlling access rights from other microcontrollers.

The SPU 26 provides a register interface comprising a set of configuration registers for controlling the various internal logic blocks 18, 20, 22 of the security system logic 24 that monitor access to memory-mapped slave devices (RAM 8, Flash 10, peripherals 12-17, etc.) and other resources (device pins 31, 32, DPPI channels, . . . ). The state of the SPU 26 determines the security states of all non-security-aware bus masters 6 and slave components 8, 10, 12-17. The SPU 26 also provides an interface for setting DPPI channels and GPIO pins as secure or non-secure. The SPU's register interface may itself be writable only by secure bus requests from the processor 4. The register interface may also contain "lock" bits which, once set, prevent further changes to the contents of respective parts of the SPU register interface until the device 1 is next reset. In this way, secure boot code can configured the SPU 26 during a boot process, and then lock the security state of the device 1 until it is next reset.

The master-side secure control logic 20 and slave-side secure control logic 22 provide a number of filter units (or firewalls), which intercept bus transfers and implement the filtering rules. These monitor access to the RAM 8, flash memory 10, memory-mapped peripherals 12, 14, 16, 17, including the GPIO controller 30, and the DPPI 28.

The filter units may be located at the edges of the bus system 2 and/or at points within the bus matrix, such as at a bridge between individual buses and/or at a bus arbiter and/or between two layers of the bus system 2. At least one firewall is located within the bus system 2, away from the edges of the bus system 2. The filter units compare the address, security state (secure or non-secure), and access type (data-read, data-write, instruction fetch), of each intercepted bus transfer with security definitions provided in the SPU 26. The security state of a bus transfer is determined by the security state of the master component that initiated the bus transfer, which can be either "secure" or "non-secure". In other embodiments multiple security statuses, or levels, may be supported (i.e., more than just two statuses).

When a prohibited access is detected, the firewall blocks the transfer (by returning a zero if it is a read access, or blocking a write operation). In some embodiments, the filter units may provide error signals through the bus system 2 and/or may trigger processor interrupts or a system reset.

The IDAU 18 can be used to indicate to the processor 4 whether particular memory addresses are Secure or Non-secure, under the control of the SPU 26. For a CPU 4 that supports ARM™ TrustZone™ for Cortex-M™, the SPU 26 controls the IDAU 18 to provide full support for:

ARM™ TrustZone™ for Cortex-M™ related instructions such as TT for reporting the security attributes of a region; and Non-Secure Callable (NSC) regions, to implement Secure entry points from Non-Secure code.

Figure 2:
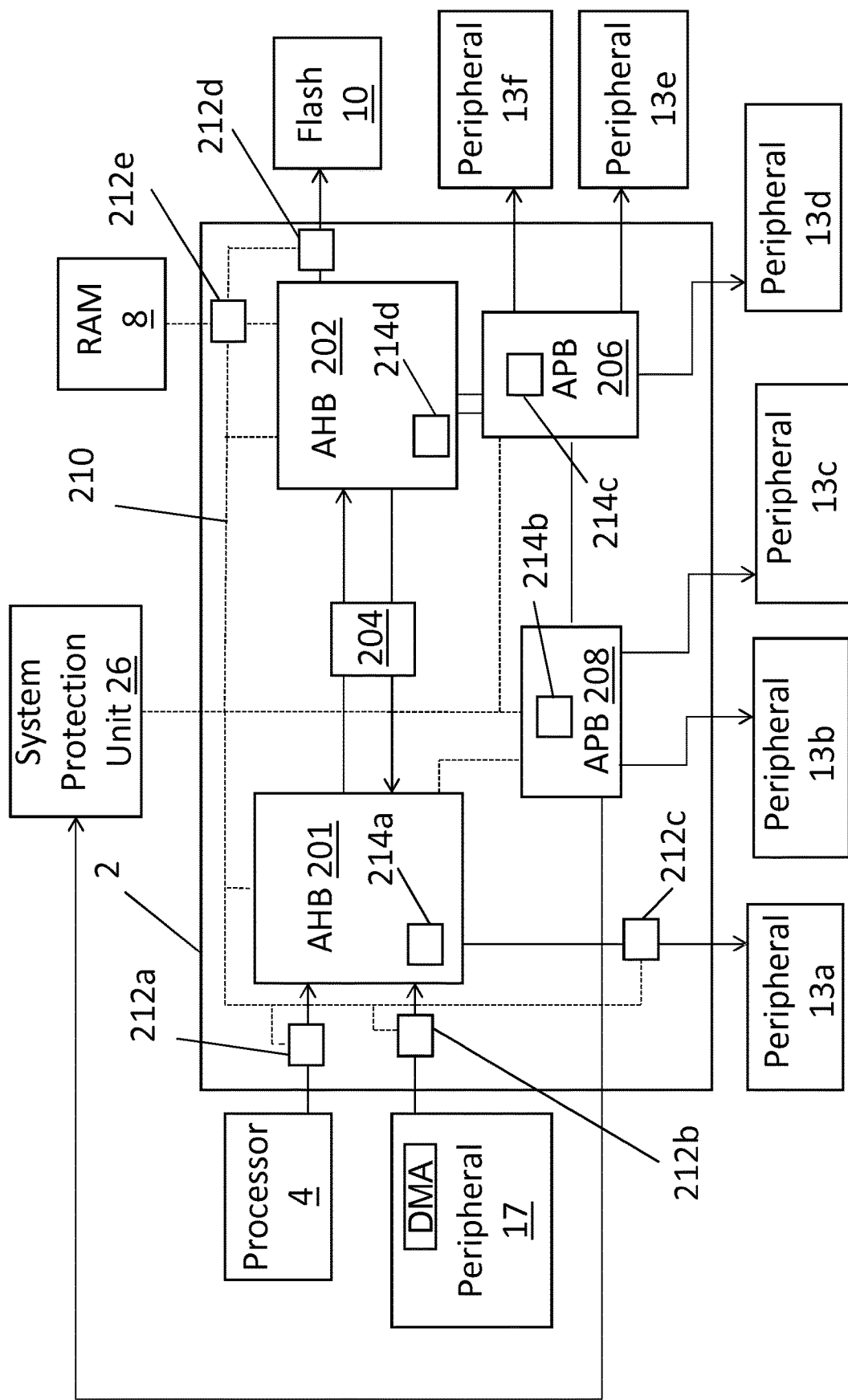
FIG. 2 is a schematic drawing of the integrated-circuit device showing further details of the bus system and the bus filtering.

FIG. 2 shows many of the same components as FIG. 1, with all like parts labelled with the same reference numerals as in FIG. 1.

The bus system 2 is shown as including a first AHB 201, a second AHB 202, a first APB 208, and a second APB 208. The first AHB 201 is connected to the second AHB 202 by means of bridge 204. Various exemplary slave peripherals 13a-13f (which may overlap with the peripherals 12, 14, 16, 17 shown in FIG. 1) are shown connected to the bus system 2. One exemplary peripheral 17 that has an integral DMA controller is connected, as a bus master, to the first AHB 201. Of course, there may be many more bus masters than are shown (e.g., ten, twenty, fifty or more) and many more slave peripherals than are shown (e.g., one hundred, two hundred or more).

FIG. 2 provides more detail of how the control logic 20, 22, represented schematically in FIG. 1, is integrated with the bus system 2. The control logic 20, 22 is implemented through a set of edge filter units 212a-212e positioned at the edges of the bus system, as well as a set of internal filter units 214a-214d positioned at points within the bus system 2, all connected by control lines 210. Some of the edge filter units 212 are located adjacent master components such as the processor 4 and exemplary DMA-equipped peripheral 17, while others are located adjacent slave components, such as a slave peripheral 13a. The internal filter units 214 are positioned at the arbiters of the AHBs 201, 202 and APBs 206, 208 or between pairs of layers in the bus system 2. In this way, the internal filter units 214 can implement master-to-slave filtering rules that apply to more than one bus master, more efficiently than if these rules were to be implemented using the edge filter units 212 adjacent the respective bus masters.

The filter units 212, 214 are configured to prevent bus transfers that do not comply with the filtering rules. The filtering rules for each master-slave pair are hardwired by the control logic 20, 22, for a given security state of the master and a given security state of the slave.

However, the security state of at least some of the masters 2, 17 and slaves (RAM 8, flash 10, and exemplary peripherals 13a-f) are configurable, being set by the components themselves (where the components are security-aware), or being set through the system protection unit (SPU) 26, for all non-security-aware components. For components that manage their own security status, their current secure/non-secure state is distributed over lines to relevant points in the filter logic 20, 22; this distribution may be direct from the component to the filter logic 20, 22, or the status may be sent via the SPU 26. The SPU 26 is the only place where the security attributes of components that are not inherently security-aware can be configured.

In some embodiments, the size and position of secure regions within the RAM 8 and flash memory 10 may be defined by writing to registers in the SPU 26—e.g., by writing start and end addresses. In other embodiments, the RAM 8 and flash 10 are pre-divided into fixed regions, each of which can have a respective security state set through the SPU 26. For example, the RAM 8 may be divided into 16 regions of 8 KiB each, and the flash 10 may be divided into 32 regions of 32 KiB each.

For each memory region, four different types of permissions can be independently configured through the SPU 26:

"Read": to allow data read access to the region (code fetch from this region is not controlled by the Read permission but by the Execute permission described below);

"Write": to allow write access to the region;
"Execute": to allow code fetch from this region (even if data read is disabled); and
"Secure": to allow only secure bus accesses.

For every security-managed component, there is at least one respective line out of the SPU 26 that communicates the security state of that component to the control logic 20, 22 (i.e., to the appropriate filter units 212, 214) as a one-bit value. The SPU 26 can also communicate the security state of paths within the bus system 2, and of groups of components, to the filter logic 20, 22, 212, 214 in the bus system.

The SPU 26 allows non-secure-aware processors and non-secure-aware peripherals to be treated, by software developers, as security-aware components, even though they are not inherently security aware. The security states that are output by the SPU 26 for non-secure-aware components may be determined by configuration settings stored in SPU configuration registers. These configuration registers may be written to by a bootloader after each reset, or may be configured by any other appropriate mechanism.

For some of the peripherals 12, 13, 14, 17 (typically most of the peripherals), the whole peripheral is always entirely in a secure state or entirely in a non-secure state, with the same secure and non-secure filtering rules being applied to bus requests addressed to the peripheral, irrespective of the specific memory address.

Also, for such peripherals 12, 13, 14, 17, any DMA accesses carried out by the peripheral are also assigned the same security state as the peripheral—i.e., such that, when the SPU 26 has configured a peripheral 17 to be in a secure state, the secure signal will be set on all bus transactions initiated by a DMA controller of the peripheral 17, and when the peripheral 17 is in a non-secure state, all of the peripheral's DMA accesses will also be non-secure.

However, for other peripherals 13 this is not necessarily the case. Certain peripheral 16 may be "split-security" peripherals, while others peripheral may have non-standard DMA security behaviour, as explained below.

A split-security peripheral 16 appears, at the system level, as a non-secure component—i.e., typically being responsive to both secure and non-secure bus requests—when set to a non-secure state. However, internally, the peripheral 16 can have different security states assigned to different registers of the peripheral, and therefore respond differently to secure bus requests compared with non-secure bus requests. In particular, the peripheral 16 may be register interfaces that provide access to functions or information when addressed by secure bus requests, but which appear blank or unresponsive when addressed by non-secure bus requests.

Figure 3:
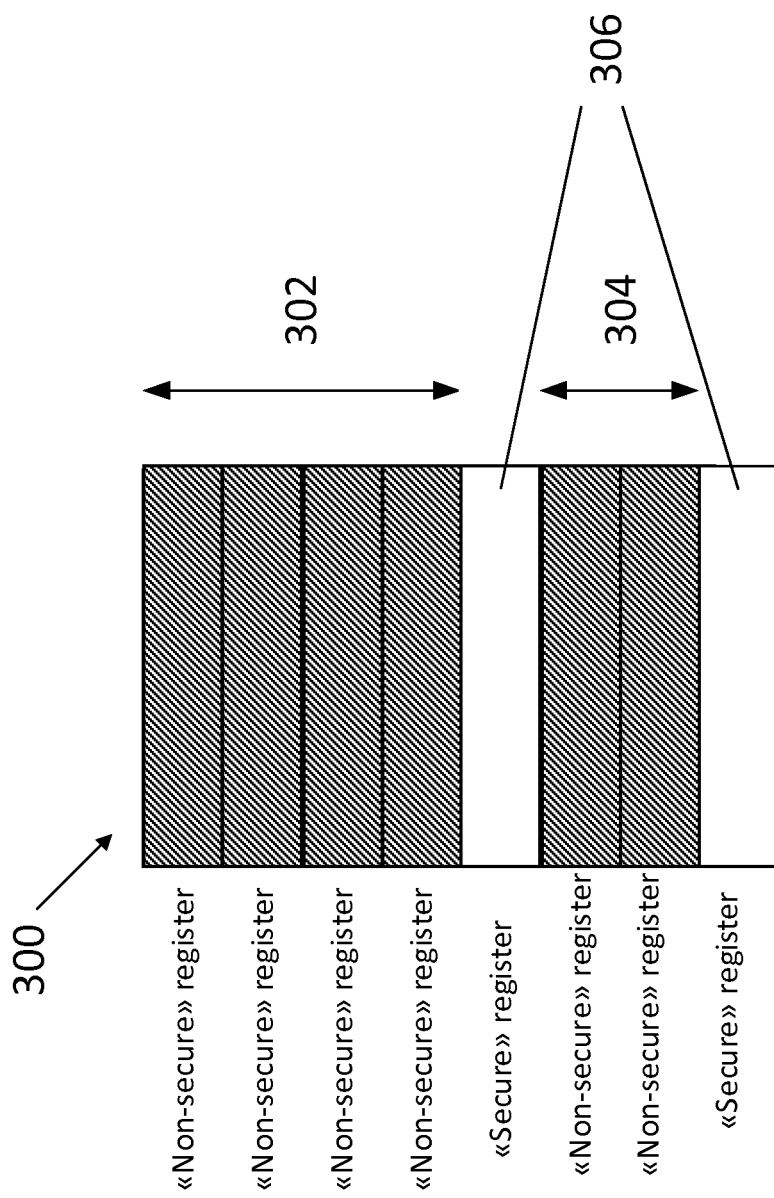
FIG. 3 is a schematic drawing of the register interface of a split-security peripheral that is integrated on the device.

FIG. 3 shows an example of a register interface 300 for a split-security peripheral 16. This peripheral 16 has two groups of "non-secure" registers 302, 304, shown as hatched areas, which will typically be accessible by non-secure masters (and which may also be accessible by secure masters, depending on the implemented filtering rules). The two non-shaded registers 306 are secure registers and will typically be accessible only by secure masters. If a non-secure bus request attempts to read one of the secure registers 306, the peripheral 16 will return zero values. If a non-secure bus request attempts to write to one of the secure registers 306, the peripheral 16 will ignore the write operation.

Note that, in contrast to secure peripherals, the non-secure bus request is not filtered by a firewall in the bus system 2, but is allowed to reach the peripheral 16. The peripheral 16 itself therefore reads the security signal from the bus system 2, accompanying the bus request, and determines how to respond, based on the security state of the bus request.

The split-security peripheral 16 can be switched, through the SPU 26, between a secure state, in which non-secure-state bus transactions will be filtered in the bus system 2 and will not reach the peripheral 16, and a non-secure state which equates to the split-security state.

Figure 4:
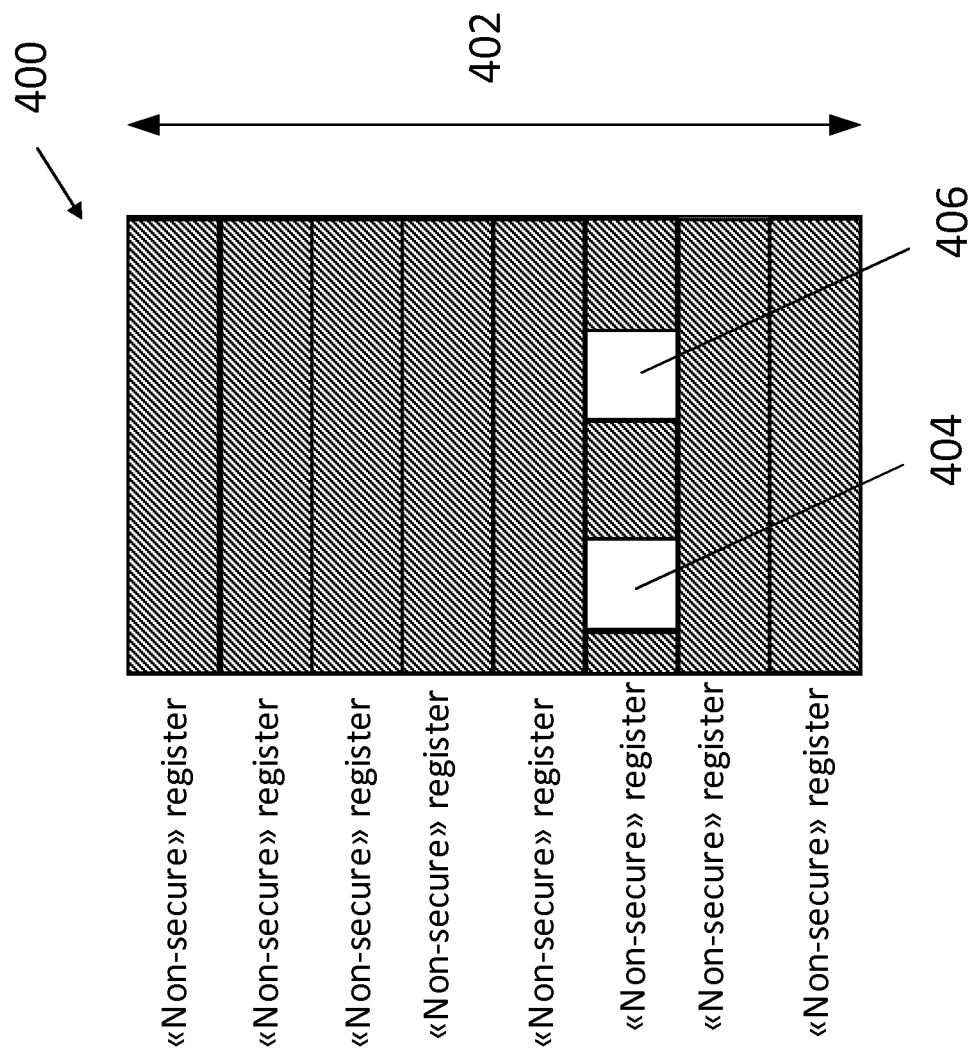
FIG. 4 is a schematic drawing of the register interface of a further split-security peripheral that is integrated on the device.

FIG. 4 also shows an example of a different register interface 400 for another split-security peripheral. In this case, all of the registers 402 are non-secure, but the particular bit fields 404 and 406 are secure bit fields which will typically be accessible only to secure code. Any code executing on a processor 4 that is in a non-secure state that attempts to read these secure bit fields 404, 406 will read zero bits, regardless of the actually values of these bits.

As already noted, security states are defined per peripheral and not by address ranges.

Peripherals that have a hardwired "non-secure" security mapping have their memory-mapped I/O addresses starting with 0×4XXX_XXXX.

Peripherals that have a hardwired "secure" security mapping have their memory-mapped I/O addresses starting with 0×5XXX_XXXX.

Peripherals that have a user-selectable security mapping are available at an address starting with:
  0×4XXX_XXXX, if the peripheral security state is set as "Non Secure"; and
  0×5XXX_XXXX, if the peripheral security state is set as "Secure".

Peripherals that have a split-security mapping are available at an address starting with:
  0×4XXX_XXXX for non-secure accesses and 0×5XXX_XXXX for secure accesses, if the peripheral security state is set as "Non Secure"; and
  0×5XXX_XXXX, if the peripheral security state is set as "Secure".

The secure registers of split-security peripherals in the 0×4XXX_XXXX range are not visible from secure code or from non-secure code; writes to these register addresses will be ignored and reads will return zero. Secure code can access both non-secure and secure registers in the 0×5XXX_XXXX range, but any access to the 0×5000_0000-0×5FFF_FFFF address range from non-secure code will be ignored and generate a SecureFault exception.

For peripherals 13 that include DMA controllers (and so are master components as well as being slave components), the standard DMA behaviour is for the DMA controller to output the same security state as the peripheral it belongs it. However, some peripherals 13 (which may include split-security peripherals 16) may exhibit non-standard DMA security behaviour. For such peripherals, the SPU 26 provides a special, per-peripheral, configuration bit which, when set, causes the standard behaviour to be overridden. When this bit is set, accesses generated by the DMA controller of the peripheral are non-secure even when the peripheral itself is set to the secure state.

This can be useful when only secure code, executing on the processor 4, is allowed to manage the peripheral, but where data output from the peripheral by DMA needs to be accessed by non-secure code. For example, a cryptographic accelerator may be configured as a secure peripheral, so that only secure operating-system code can control it. However, non-secure user code may be able to invoke cryptographic operations by making a function call or system call to the operating-system. If the DMA controller of the crypto-accelerator were to output decrypted plaintext to RAM 8 or flash 10 in a secure mode, it could be possible for malicious user code to overwrite sensitive data or to inject malicious software instructions into a secure kernel region. By using the SPU 26 to configure the crypto-engine to implement the non-standard DMA security behaviour, the plaintext data will then be written to memory using non-secure data-write bus requests. This prevents any possibility of the output data being written to a secure region of memory. This improves the security of the device 1.

A crypto-accelerator is just one example; this non-standard DMA security behaviour can be useful whenever secure code manages a peripheral, but non-secure code needs to access the data produced by the peripheral.

Figure 5:
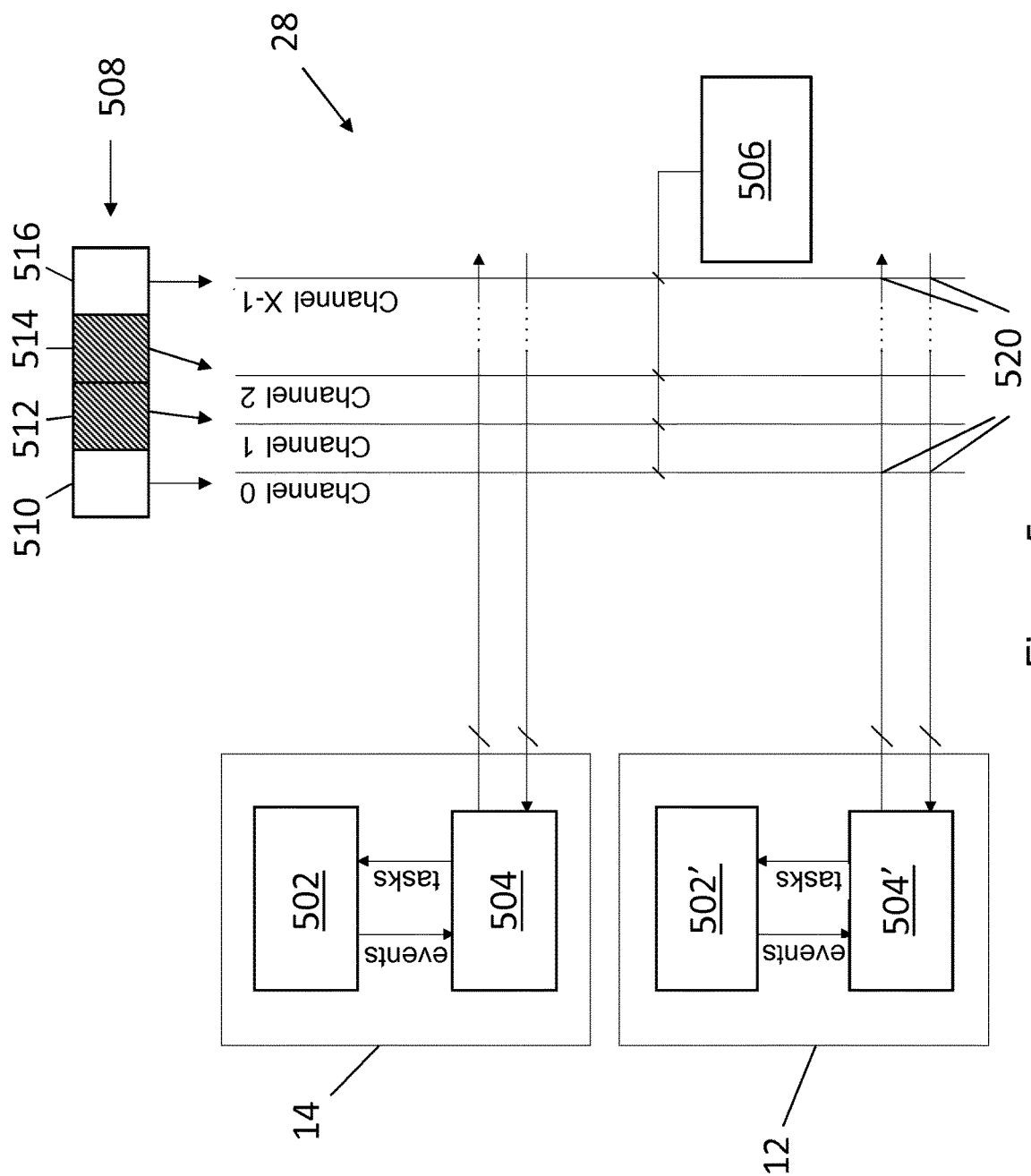
FIG. 5 is a schematic drawing showing more details of the Distributed Programmable Peripheral Interconnect (DPPI) that is integrated on the device.

FIG. 5 shows the Distributed Programmable Peripheral Interconnect (DPPI) 28 of FIG. 1 in more detail. The DPPI 28 includes a DPPI controller (DPPIC) 506, which provides a register interface for configuring the DPPI 28 over the bus system 2. The DPPI controller 506 is an example of a split-security peripheral.

The DPPI 28 provides a number of channels, here labelled 0, 1, 2, . . . , X−1, which can be used to interconnect peripherals of the device 1. FIG. 5 only shows two peripherals 12, 14 by way of example; however, the DPPI 28 will typically be connected to many more of the peripherals 13. Each peripheral comprises a peripheral core 502, 502' and a PPI bus 504, 504'. The core 502 signals to the PPI bus 504 when predetermined events occur in the core 502 (e.g., when a cryptographic core completes an encryption operation). The PPI bus 504 can also signal task inputs to the peripheral core 502, which instruct the core 502 to perform a predetermined task (e.g., to output data over an SPI connection). As explained above, with reference to FIG. 1, the DPPI 28 can be used to provide peripheral-to-peripheral signalling without requiring a processor interrupt or other processor involvement.

Tasks are used to trigger actions in a peripheral 12, 14—for example, to start a particular behaviour. A peripheral 12, 14 can implement multiple different tasks. Each task has a separate task register in the peripheral's task register group. A task can be triggered when a bus master (e.g., software executing on the processor) writes a '1' to the task register, or when the peripheral itself or another peripheral toggles the corresponding task signal by means of an event signal sent over the DPPI 28.

Events are used to notify peripherals 12, 14 and the processor 4 about events that have happened—for example, a state change in a peripheral. A peripheral 12, 14 may generate multiple different events. Each event has a separate event register in the peripheral's event register group. An event is generated when the peripheral itself toggles the corresponding event signal, leading to an event signal being output onto any DPPI 28 channel to which the event has been subscribed. The event register is also updated to reflect that the event has been generated (in case the processor wishes to monitor the event register, for instance).

Each channel of the DPPI 28 can be defined as "secure" or "non-secure" through the system protection unit (SPU) 26. The SPU 26 includes a DPPI security attribute register 508, addressable over the bus system 2. Respective bits in the DPPI security attribute register 508 correspond to respective channel of the DPPI. Each bit indicates the security state of its corresponding channel. In this example, bits 510 and 516 corresponds to Channels 0 and X−1, respectively, and in this case indicate that these channels are secure channel. Bits 512 and 514 correspond to Channels 1 and 2, respectively, and indicate that these channels are non-secure. Once the security attribute register 508 has been configured (e.g., by secure boot code), its contents can be locked (i.e., no further writes allowed) until the device 1 is next reset, by setting a bit in an associated "lock" register (not shown).

Only a peripheral 14 in the secure state can push events to a secure channel. If a non-secure peripheral 12 tries to push an event to a secure channel 0, X−1, then nothing will happen. If a non-secure peripheral 12 tries to subscribe to a secure channel 0, X−1 it will not see any events. The connections 520 between the PPI bus 504' of the non-secure peripheral 12 and the secure channels 0, X−1 are blocked by firewalls in the DPPI 28.

The DPPI controller (DPPIC) 506 provides a register interface for enabling and disabling each channel. It also allows a bus master to define groups of channels. This then allows a bus master to enable or disable all the channels within a group, conveniently, through a single register write. If all the channels of a group are non-secure, the group is considered to be non-secure. If at least one of the channels of the group is secure, then the group is considered as secure. A bit-field position for enabling and disabling a secure channel of secure group of channels can only be written to by a bus master that is in secure mode, while a bit-field position for enabling and disabling a non-secure channel or group of channels can be written to by secure and non-secure bus requests.

The DPPI controller 506 is a split-security peripheral in that it appears to the hardware security system logic 24 in the bus system 2 as a non-secure peripheral, but reacts differently to secure and non-secure accesses.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
   a bus system;
   a processor, connected to the bus system;
   a plurality of peripherals, each connected to the bus system;
   hardware filter logic; and
   a peripheral interconnect system, separate from the bus system and connected to the plurality of peripherals,
   wherein:
   for each of the plurality of peripherals, the hardware filter logic stores a respective value determining whether the peripheral is in a secure state;
   the peripheral interconnect system provides a set of one or more channels for signaling events between peripherals of the plurality of peripherals;
   at least one channel of the set of channels is a secure channel or is configurable to be a secure channel;
   the peripheral interconnect system is configured to allow an event signal from a peripheral that is in the secure state to be sent over a secure channel of the set of channels; and
   the peripheral interconnect system is configured to prevent an event signal from a peripheral that is not in the secure state from being sent over the secure channel;
   wherein the integrated-circuit device further comprises at least one of the following sets of features:
   A) the peripheral interconnect system provides a plurality of channels, wherein each channel that is not configured as a secure channel is a non-secure channel, and wherein at least one channel of the plurality of channels is a non-secure channel or is configurable to be a non-secure channel;

B) the peripheral interconnect system is configured to allow event signals from secure peripherals and from non-secure peripherals to be sent over a non-secure channel of the set of channels;

C) the peripheral interconnect system, or the hardware filter logic, provides a register interface for configuring channels of the set of channels as secure channels;

D) the hardware filter logic comprises a system protection unit which provides a register interface for controlling whether one or more of the plurality of peripherals is in a secure state.

2. The integrated-circuit device of claim 1, wherein the peripheral interconnect system is further configured to:

allow a peripheral that is in the secure state to receive an event signal over a secure channel; and prevent a peripheral that is not in the secure state from receiving an event signal over a secure channel.

3. The integrated-circuit device of claim 1, wherein the bus system is configured to carry bus transactions and to carry security-state signals for distinguishing between secure bus transactions and non-secure bus transactions, and wherein the hardware filter logic is connected to the bus system and is configured to allow or block bus transactions on the bus system, in dependence on at least i) the security state of each bus transaction, and ii) whether the bus transaction addresses a peripheral that is in a secure state.

4. The integrated-circuit device of claim 1, wherein each of the plurality of peripherals comprises one or more respective event outputs, or one or more respective task inputs, wherein each event output is connectable to any of the one or more channels, and wherein each task input is connectable to any of the channels.

5. The integrated-circuit device of claim 4, wherein each peripheral having an event output comprises a multiplexer for connecting the event output to a selectable one of the channels, wherein each peripheral having a task input comprises a demultiplexer for connecting a selectable one of the channels to the task input, and wherein the peripheral interconnect provides a register interface for selecting said event-output channels and task-input channels.

6. The integrated-circuit device of claim 1, wherein the peripheral interconnect system comprises an interconnect controller peripheral, accessible over the bus system, wherein the interconnect controller peripheral provides a register interface for controlling the peripheral interconnect system.

7. The integrated-circuit device of claim 6, wherein the interconnect controller peripheral comprises an input for receiving security-state signals from the bus system, and wherein the interconnect controller peripheral supports a split-security state in which the interconnect controller peripheral is configured to:

prevent a non-secure bus transaction from accessing a first hardware register that relates to the configuration of a secure channel of the set of channels;

allow a secure bus transaction to access the first hardware register; and allow a non-secure bus transaction to access a second hardware register that relates to the configuration of a non-secure channel of the set of channels.

8. The integrated-circuit device of claim 7, wherein the first hardware register provides an interface for enabling and disabling the secure channel, and wherein the second hardware register provides an interface for enabling and disabling the non-secure channel.

9. The integrated-circuit device of claim 6, wherein the interconnect controller peripheral provides an interface for grouping two or more channels into a group, and for enabling and disabling the group of channels with a single data write, wherein the peripheral interconnect system is configured to prevent an event signal from a peripheral that is not in the secure state from being sent over any channel of the group when at least one channel in the group is a secure channel.

10. A method of operating an integrated-circuit device, wherein the integrated-circuit device comprises:

a bus system;

a processor, connected to the bus system;

a plurality of peripherals, each connected to the bus system;

hardware filter logic; and a peripheral interconnect system, separate from the bus system and connected to the plurality of peripherals, providing a set of one or more channels for signaling events between peripherals of the plurality of peripherals, wherein:

for each of the plurality of peripherals, the hardware filter logic stores a respective value determining whether the peripheral is in a secure state; and a channel of the set of channels is a secure channel or is configurable to be a secure channel, the method comprising:

the peripheral interconnect system allowing an event signal from a peripheral that is in the secure state to be sent over the secure channel; and the peripheral interconnect system preventing an event signal from a peripheral that is not in the secure state from being sent over the secure channel;

wherein the integrated-circuit device further comprises at least one of the following sets of features:

A) the peripheral interconnect system provides a plurality of channels, wherein each channel that is not configured as a secure channel is a non-secure channel, and wherein at least one channel of the plurality of channels is a non-secure channel or is configurable to be a non-secure channel;

B) the peripheral interconnect system is configured to allow event signals from secure peripherals and from non-secure peripherals to be sent over a non-secure channel of the set of channels;

C) the peripheral interconnect system, or the hardware filter logic, provides a register interface for configuring channels of the set of channels as secure channels;

D) the hardware filter logic comprises a system protection unit which provides a register interface for controlling whether one or more of the plurality of peripherals is in a secure state.

* * * * *